US011126907B2

(12) United States Patent
Johnson

(10) Patent No.: US 11,126,907 B2
(45) Date of Patent: Sep. 21, 2021

(54) METHOD OF MANUFACTURING AN RFID TAG ASSEMBLY AND RFID TAG ASSEMBLY

(71) Applicant: Spa Track Medical Limited, Droitwich Spa (GB)

(72) Inventor: Martin Stanley Johnson, Southam (GB)

(73) Assignee: Spa Track Medical Limited, Droitwich Spa (GB)

( * ) Notice: Subject to any disclaimer, the term of this patent is extended or adjusted under 35 U.S.C. 154(b) by 445 days.

(21) Appl. No.: 15/760,673

(22) PCT Filed: Sep. 13, 2016

(86) PCT No.: PCT/GB2016/052818
§ 371 (c)(1),
(2) Date: Mar. 16, 2018

(87) PCT Pub. No.: WO2017/046575
PCT Pub. Date: Mar. 23, 2017

(65) Prior Publication Data
US 2019/0087703 A1    Mar. 21, 2019

(30) Foreign Application Priority Data
Sep. 16, 2015 (GB) ..................................... 1516378

(51) Int. Cl.
*G06K 19/077* (2006.01)
*G06K 19/07* (2006.01)

(52) U.S. Cl.
CPC ... *G06K 19/07724* (2013.01); *G06K 19/0723* (2013.01); *G06K 19/07722* (2013.01); *G06K 19/07771* (2013.01)

(58) Field of Classification Search
CPC ....... H01L 2924/00014; H01L 2924/00; H01L 2924/00011; H01L 2924/00012;
(Continued)

(56) References Cited

U.S. PATENT DOCUMENTS

2005/0199734 A1* 9/2005 Puschner .......... B29C 45/14836
235/492
2008/0042266 A1* 2/2008 Kagaya ............ G06K 19/07718
257/724
(Continued)

FOREIGN PATENT DOCUMENTS

JP    2007-199823    8/2007
WO    2015022747 A1    2/2015

OTHER PUBLICATIONS

International Search Report and Written Opinion dated Mar. 8, 2017, in International Patent Application No. PCT/GB2016/052818, filed on Sep. 13, 2016.

*Primary Examiner* — Thien M Le
*Assistant Examiner* — Tae W Kim
(74) *Attorney, Agent, or Firm* — Downs Rachlin Martin PLLC

(57) ABSTRACT

A method of manufacturing an RFID tag assembly, the method comprising: providing a mounting base made of an electrically conductive material; providing a passive mount-on-metal RFID tag, the RFID tag comprising an IC chip and an antenna provided on one side; mounting the RFID tag on the mounting base with said one side of the RFID tag coupled to the mounting base, to form an RFID tag-mounting base sub-assembly; providing a mold tool comprising a mold cavity shaped to form a cover of the RFID tag assembly and locating the RFID tag-mounting base sub-assembly within the mold cavity; and delivering a substantially RF transparent material in a molten state into the void between the mold tool and the RFID tag-mounting base sub-assembly and allowing the material to cool into a solid state to form a cover over the RFID tag-mounting base sub-assembly, such that the mounting base and the cover together encapsulate the RFID tag. The substantially RF transparent material has a temperature in the molten state on (Continued)

delivery into the void that is higher than a maximum tolerable temperature of the IC chip and the molten material is delivered into the void at a position removed from IC chip. The IC chip position such that the temperature of the molten material does not exceed the maximum tolerable temperature of the IC chip when the substantially RF transparent material reaches the IC chip.

15 Claims, 10 Drawing Sheets

(58) Field of Classification Search
CPC . H01L 2224/48091; H01L 2224/32225; H01L 2224/48227; H01L 2924/0002; H01L 2224/16225; H01L 2924/181; H01L 2224/73265; H01L 2924/01005; H01L 2224/73204; H01L 2924/15311; H01L 2224/05184; H01L 2224/13111; H01L 2224/32245; H01L 2224/45124; H01L 2224/45144; H01L 2924/00013; H01L 2924/01033; H01L 2924/01077; H01L 2924/10253; H01L 2924/12042; H01L 2924/15787; G06K 19/07749; G06K 19/07724; G06K 19/04; G06K 19/07745; G06K 19/047; G06K 19/0775; G06K 19/07771; G06K 19/07781; B29C 45/1671; B29C 2045/14852; B29C 45/14836; B29C 39/10; B29C 45/14639; H01Q 1/2225; H05K 3/284
USPC ......................................................... 235/492
See application file for complete search history.

(56) References Cited

U.S. PATENT DOCUMENTS

| | | | |
|---|---|---|---|
| 2008/0057258 A1* | 3/2008 | Kanno | B29C 45/14639 428/64.4 |
| 2013/0048651 A1* | 2/2013 | Eggmann | B29C 45/14065 220/660 |
| 2014/0357748 A1* | 12/2014 | Yamaoka | C08J 9/122 521/138 |
| 2015/0174803 A1* | 6/2015 | Newman | B29C 45/14 264/40.1 |

* cited by examiner

METHOD OF MANUFACTURING AN RFID TAG ASSEMBLY AND RFID TAG ASSEMBLY

TECHNICAL FIELD

The invention relates to a method of manufacturing an RFID tag assembly. The invention further relates to an RFID tag assembly and to a surgical instrument having a said RFID tag assembly mounted thereon.

BACKGROUND

Passive radio-frequency identification, RFID, tags, which comprise an integrated circuit chip and an RF antenna, are well known and are widely used in asset tracking systems. The antenna performance, and thus the distance over which the RFID tag is able to communicate, can change in response to the surface on which an RFID tag is mounted. In particular, when an RFID tag is mounted on an object having a metal surface the antenna performance deteriorates, and the communication distance reduces. Recently, RFID tags which are capable of operating when mounted on a metal surface have been developed; these are known as 'mount-on-metal' RFID tags.

Sterilisation and disinfection of surgical instruments are essential components of infection-control procedures. There is also an increasingly felt need to ensure that no surgical instrument has been missed out from an instrument set required for a particular surgical procedure, misplaced during surgery or the sterilisation and disinfection process, or left inside a patient. It is therefore desirable to be able to track surgical instruments during use, and from the operating theatre, through the sterilisation and disinfection process, and back to the operating theatre. Many hospitals are also being required to maintain records of which surgical instruments have been used on which patients over the lifetime of the instrument, which can be several years.

The use of RFID tags for asset tracking of surgical instruments has been proposed, for example the RFID tag suitable for mounting on surgical instruments described in WO 2013/020944 and the ORLocate® RFID tag system provided by Haldor Advanced Technologies Ltd. However, the RFID tags in these systems are relatively large, so they can impede the use of a surgical instrument by a surgeon, and typically they must be read individually or in small groups on a special tray.

SUMMARY

It is an object to provide an improved method of manufacturing an RFID tag assembly. It is a further object to provide an improved RFID tag assembly. It is a further object to provide an improved surgical instrument.

A first aspect of the invention provides a method of manufacturing an RFID tag assembly. The method comprises providing a mounting base made of an electrically conductive material and providing a passive mount-on-metal RFID tag. The RFID tag comprises an integrated circuit, IC, chip provided at a first position and an antenna provided on one side. The method comprises mounting the RFID tag on the mounting base with said one side of the RFID tag coupled to a first side of the mounting base, to form an RFID tag-mounting base sub-assembly. The method comprises providing a mould tool comprising a mould cavity shaped to form a cover of the RFID tag assembly. The method comprises locating the RFID tag-mounting base sub-assembly within the mould cavity such that a void defining the cover is formed between the mould tool and the RFID tag-mounting base sub-assembly. The method comprises delivering a substantially RF transparent material in a molten state into the void between the mould tool and the RFID tag-mounting base sub-assembly. The method comprises allowing the substantially RF transparent material to cool into a solid state to thereby form a cover over the RFID tag-mounting base sub-assembly, such that the mounting base and the cover together encapsulate the RFID tag. The substantially RF transparent material has a temperature in the molten state on delivery into the void that is higher than a maximum tolerable temperature of the integrated circuit chip. The substantially RF transparent material is delivered into the void at a second position removed from first position and the mould tool is configured to cause the substantially RF transparent material to cool as it flows towards the first position such that the temperature of the substantially RF transparent material does not exceed the maximum tolerable temperature of the integrated circuit chip when the substantially RF transparent material reaches the first position.

The method may enable an RFID tag assembly to be formed having the cover bonded to the RFID tag and mounting base, enabling the RFID tag assembly to be formed without requiring any mechanical fixing between the cover and the mounting base. The method may enable an RFID tag assembly to be produced using fewer components and with fewer processing steps. Moulding the cover over the RFID tag-mounting base sub-assembly may enable smaller RFID tags to be used, and the RFID tag assembly to be smaller than is possible for prior art RFID tags for use on surgical instruments. The method may enable the cover of the RFID tag to be formed by moulding, for example using known injection moulding techniques, without damaging the IC chip of the RFID tag.

Using a mounting base made of an electrically conductive material may provide consistent grounding of the RFID tag to a consistent electrically conductive mass, which may ensure consistent operation of the RFID tag irrespective of the size or shape of metal object on which the RFID tag assembly is mounted. Using a mounting base made of an electrically conductive material may mitigate the occurrence of detuning of the RFID tag which can occur when a passive mount-on-metal RFID tag is not properly grounded. This may increase the communication distance of the RFID tag.

In an embodiment, the mounting base comprises a central section, on which the RFID tag is mounted, a first end section extending from a first end of the central section and a second end section extending from a second end of the central section. The RFID tag-mounting base sub-assembly is located within the mould cavity such that the first end section and the second end section each extend beyond the mould cavity, to thereby form respective tags extending beyond the cover of the resulting RFID tag assembly. In this way tags may be provided by which the RFID tag assembly may be picked and placed, using for example a robot, without handling the cover. The tags that are formed may also enable the RFID tag assembly to be welded onto a body of a device, such as a surgical instrument.

In an embodiment, the antenna has a longitudinal axis and the mounting base additionally comprises a first end wall extending outwardly from the mounting base generally at one end of the longitudinal axis of the antenna. The mould tool comprises a delivery aperture at the second position, the delivery aperture generally facing the first end wall of the mounting base. The substantially RF transparent material is delivered into the void through the delivery aperture and impacts on the first end wall, such that the substantially RF transparent material is forced to flow into the void and around the RFID tag-mounting base sub-assembly towards the integrated circuit chip at the first position. Providing the first end wall may enable the molten material to be delivered, for example injected, into the mould at high pressure without dislodging the RFID tag from the mounting base; delivering the molten material at high pressure may ensure that the molten material flows into and fills the entire void.

In an embodiment, the mounting base comprises a second end wall extending outwardly from the mounting base generally at a second end of the longitudinal axis of the antenna. The RFID tag is mounted on the mounting base such that an end of the RFID tag closest to the first position is in contact with the second end wall. This may further reduce the temperature of the molten material before it reaches the location of the IC chip, and may serve to conduct heat away from the IC chip.

In an embodiment, the integrated circuit chip is provided on said second end of the RFID tag or on a side of the RFID tag at said second end. This may maximize the distance that the molten material must flow before reaching the IC chip, thus maximizing the amount of cooling undergone by the molten material before reaching the IC chip.

In an embodiment, the mould tool comprises a delivery aperture at the second position, the delivery aperture generally facing towards the first side of the mounting base. The substantially RF transparent material is delivered into the void through the delivery aperture, such that the substantially RF transparent material is caused to flow into the void and around the RFID tag-mounting base sub-assembly towards the integrated circuit chip at the first position. This may enable the molten material to be delivered, for example injected, into the mould at high pressure without dislodging the RFID tag from the mounting base; delivering the molten material at high pressure may ensure that the molten material flows into and fills the entire void.

In an embodiment, the delivery aperture is located generally centrally to the mould cavity of the mould tool such that the substantially RF transparent material is delivered into the void generally centrally onto the RFID tag. This may enable the molten material to be delivered, for example injected, into the mould at high pressure without dislodging the RFID tag from the mounting base; delivering the molten material at high pressure may ensure that the molten material flows into and fills the entire void.

In an embodiment, the antenna has a longitudinal axis and the mounting base additionally comprises a first end wall extending outwardly from the mounting base generally at one end of the longitudinal axis of the antenna. The delivery aperture is located generally at said one end of the longitudinal axis of the antenna such that the substantially RF transparent material is delivered into the void generally at one end. Provision of the first end wall may further protect the RFID tag from being dislodged by the flow of molten material into the mould void.

In an embodiment, the substantially RF transparent material in a molten state is delivered into the void in a first stage and in a second, subsequent stage. The first stage comprises delivering the substantially RF transparent material into the void to fill the void to a depth substantially level with a height of the RFID tag-mounting base sub-assembly and allowing the substantially RF transparent material to cool into a solid state to thereby form a first part of the cover. The second stage comprises delivering the substantially RF transparent material into a remaining part of the void between the mould tool, the RFID tag-mounting base sub-assembly and the first part of the cover to fill the remaining part of the void and allowing the substantially RF transparent material to cool into a solid state to thereby form a second part of the cover, the second part of the cover bonding to the first part of the cover. The two stage process may reduce the temperature of the molten material at the IC chip by delivering a lower mass of the substantially RF transparent material in the molten state which cools around the IC chip before a further amount of the molten material.

In an embodiment, the method further comprises pressing the RFID tag onto the mounting base during delivery and cooling of the substantially RF transparent material. This may ensure good electromagnetic contact between the RFID tag and the mounting base during the first stage and may ensure the delivery of the further amount of molten material during the second stage does not cause the RFID tag to move.

In an embodiment, at least the first end wall has a keying formation provided therein, the keying formation engaging with by the substantially RF transparent material to key the cover to the RFID tag-mounting base sub-assembly. Providing a keying formation in at least one end wall may additionally provide mechanical coupling between the cover and the mounting base, which may increase the strength of the connection between the cover and the mounting base.

In an embodiment, the keying formation is an aperture formed in the end wall that is filled by the substantially RF transparent material or a ledge formed along an edge of the end wall that is surrounded by the substantially RF transparent material.

In an embodiment, the substantially RF transparent material is a thermoplastic.

In an embodiment, the thermoplastic is polyphenylsulfone. This may ensure that the cover is scratch resistant, has high impact strength and is able to withstand the high temperature autoclave disinfection process applied to surgical instruments. This may also ensure that the RFID tag assembly is suitable for use on medical devices, including surgical instruments.

In an embodiment, the method further comprises applying a layer of a second thermoplastic material or a thermoset elastomer over an area of the RFID tag comprising the IC chip. The second thermoplastic material or a thermoset elastomer being applied at a temperature lower than the maximum tolerable temperature of the IC chip. This may provide a heat shield over the IC chip prior to moulding the cover from the substantially RF transparent material.

In an embodiment, the thermoset material is silicone.

In an embodiment, said one side of the RFID tag is close coupled to the first side of the mounting base. This may enable an optimal ground of the RFID tag to the mounting base.

In an embodiment, the antenna has an antenna plane and the or each end wall extends generally orthogonally to the antenna plane. This may reduce disruption of the antenna field by an end wall; extending in this direction the or each end wall may be substantially outside the antenna field.

In an embodiment, the mounting base has an engagement lip extending along at least part of each longitudinal edge. The engagement lip at least partly defines a locating recess for locating the RFID tag on the first side of the mounting base. This may improve the coupling between the mounting base and the RFID tag.

In an embodiment, the RFID tag is mounted on the mounting base using an adhesive. This may improve the coupling between the mounting base and the RFID tag.

In an embodiment, the antenna is a dipole antenna comprising first and second antenna portions. Each antenna portion has a longitudinal axis and an antenna plane. The first antenna portion is provided on said one side of the RFID tag and the second antenna portion is provided on a second side of the RFID tag, generally opposite said one side. This may enable a larger antenna to be used while maintaining good grounding between the antenna and the mounting base. Providing the or each end wall generally at a respective end of the longitudinal axis of the antenna may reduce disruption of the antenna field by a said end wall; in this location the or each end wall may be substantially outside the antenna field.

In an embodiment, the antenna is configured to transmit and received linearly polarised RF signals.

In an embodiment, the RFID tag is a ceramic passive mount on metal comprising a ceramic core. The antenna portions are provided on respective sides of the ceramic core and the IC chip is provided on one end of the ceramic core. The ceramic core may prevent inductive coupling between the antenna portions, which may ensure that the signal power of an RF return signal transmitted by the RFID tag is maintained at a preselected level. Maintaining a separation between the antenna portions with the ceramic core may ensure that the signal power of an RF return signal transmitted by the RFID tag is maintained at a preselected level.

In an embodiment, the electrically conductive material is one of a metal and a carbon-fibre composite. Using a metal mounting base may provide consistent grounding to metal of the RFID tag to a consistent mass, which may ensure consistent operation of the RFID tag irrespective of the size or shape of metal object on which the RFID tag assembly is mounted. The mounting base may mitigate the occurrence of detuning of the RFID tag which can occur when a passive mount-on-metal RFID tag is not properly grounded. This may increase the communication distance of the RFID tag.

In an embodiment, the metal is a medical grade stainless steel.

In an embodiment, the substantially RF transparent material substantially electrically non-conductive. This may prevent an electrical short circuit being formed between the antenna portions as a result of contact with an electrically conductive item. This may ensure that the signal power of an RF return signal transmitted by the RFID tag is maintained at a preselected level.

In an embodiment, the mould tool is shaped to form the cover with a smooth external shape. This may minimize the risk of damage to a user's hand or gloves during use.

A second aspect of the invention provides an RFID tag assembly comprising a mounting base, a passive mount-on-metal RFID tag and a moulded cover. The mounting base is made of an electrically conductive material. The RFID tag comprises an integrated circuit, IC, chip and an antenna provided on one side. The RFID tag is mounted on the mounting base with said one side of the RFID tag coupled to a first side of the mounting base, to form an RFID tag-mounting base sub-assembly. The moulded cover is made of a substantially RF transparent material. The moulded cover is moulded over the RFID tag-mounting base sub-assembly such that the mounting base and the moulded cover together encapsulate the RFID tag.

Use of a moulded cover may enable the cover to be bonded to the RFID tag and mounting base, enabling the RFID tag assembly to be formed without requiring any mechanical fixing between the cover and the mounting base. Use of a moulded cover may enable the RFID tag assembly to be produced using fewer components and with fewer processing steps. Use of a moulded cover may enable may enable smaller RFID tags to be used, and the RFID tag assembly to be smaller than is possible for prior art RFID tags for use on surgical instruments.

Using a mounting base made of an electrically conductive material may provide consistent grounding of the RFID tag to a consistent electrically conductive mass, which may ensure consistent operation of the RFID tag irrespective of the size or shape of metal object on which the RFID tag assembly is mounted. Using a mounting base made of an electrically conductive material may mitigate the occurrence of detuning of the RFID tag which can occur when a passive mount-on-metal RFID tag is not properly grounded. This may increase the communication distance of the RFID tag.

In an embodiment, the mounting base comprises a central section, on which the RFID tag is mounted, a first end section extending from a first end of the central section and a second end section extending from a second end of the central section. The moulded cover is formed over the RFID tag-mounting base sub-assembly such that the first end section and the second end section form respective tags extending beyond the cover. The tags may enable the RFID tag assembly may be picked and placed, using for example a robot, without handling the cover. The tags may also enable the RFID tag assembly to be welded onto a body of a device, such as a surgical instrument.

In an embodiment, the antenna has a longitudinal axis and the mounting base additionally comprises a first end wall extending outwardly from the mounting base generally at one end of the longitudinal axis of the antenna.

In an embodiment, the mounting base comprises a keying formation. The keying formation is configured for engagement with the substantially RF transparent material of the moulded cover, to key the cover to the RFID tag-mounting base sub-assembly. This may additionally provide mechanical coupling between the moulded cover and the mounting base, which may increase the strength of the connection between the moulded cover and the mounting base.

In an embodiment, the first end wall has a keying formation provided therein. The keying formation engaging with the substantially RF transparent material of the moulded cover, to key the cover to the RFID tag-mounting base sub-assembly. This may additionally provide mechanical coupling between the moulded cover and the mounting base, which may increase the strength of the connection between the moulded cover and the mounting base.

In an embodiment, the keying formation is an aperture formed in the end wall that is filled by the substantially RF transparent material or a ledge formed along an edge of the end wall that is surrounded by the substantially RF transparent material.

In an embodiment, the substantially RF transparent material is a thermoplastic.

In an embodiment, the thermoplastic is polyphenylsulfone. This may ensure that the moulded cover is scratch resistant, has high impact strength and is able to withstand the high temperature autoclave disinfection process applied to surgical instruments. This may also ensure that the RFID tag assembly is suitable for use on medical devices, including surgical instruments.

In an embodiment, the method further comprises applying a layer of a second thermoplastic material or a thermoset elastomer over an area of the RFID tag comprising the IC chip. The second thermoplastic material or a thermoset elastomer being applied at a temperature lower than the maximum tolerable temperature of the IC chip. This may provide a heat shield over the IC chip prior to moulding the cover from the substantially RF transparent material.

In an embodiment, the thermoset material is silicone.

In an embodiment, said one side of the RFID tag is close coupled to the first side of the mounting base. This may enable an optimal ground of the RFID tag to the mounting base.

In an embodiment, the antenna has an antenna plane and the or each end wall extends generally orthogonally to the antenna plane. This may reduce disruption of the antenna field by an end wall; extending in this direction the or each end wall may be substantially outside the antenna field.

In an embodiment, the mounting base has an engagement lip extending along at least part of each longitudinal edge. The engagement lip at least partly defines a locating recess for locating the RFID tag on the first side of the mounting base. This may improve the coupling between the mounting base and the RFID tag.

In an embodiment, the RFID tag is mounted on the mounting base using an adhesive. This may improve the coupling between the mounting base and the RFID tag.

In an embodiment, the antenna is a dipole antenna comprising first and second antenna portions. Each antenna portion has a longitudinal axis and an antenna plane. The first antenna portion is provided on said one side of the RFID tag and the second antenna portion is provided on a second side of the RFID tag, generally opposite said one side. This may enable a larger antenna to be used while maintaining good grounding between the antenna and the mounting base. Providing the or each end wall generally at a respective end of the longitudinal axis of the antenna may reduce disruption of the antenna field by a said end wall; in this location the or each end wall may be substantially outside the antenna field.

In an embodiment, the antenna is configured to transmit and received linearly polarised RF signals.

In an embodiment, the RFID tag is a ceramic passive mount on metal comprising a ceramic core. The antenna portions are provided on respective sides of the ceramic core and the IC chip is provided on one end of the ceramic core. The ceramic core may prevent inductive coupling between the antenna portions, which may ensure that the signal power of an RF return signal transmitted by the RFID tag is maintained at a preselected level. Maintaining a separation between the antenna portions with the ceramic core may ensure that the signal power of an RF return signal transmitted by the RFID tag is maintained at a preselected level.

In an embodiment, the electrically conductive material is one of a metal and a carbon-fibre composite. Using a metal mounting base may provide consistent grounding to metal of the RFID tag to a consistent mass, which may ensure consistent operation of the RFID tag irrespective of the size or shape of metal object on which the RFID tag assembly is mounted. The mounting base may mitigate the occurrence of detuning of the RFID tag which can occur when a passive mount-on-metal RFID tag is not properly grounded. This may increase the communication distance of the RFID tag.

In an embodiment, the metal is a medical grade stainless steel.

In an embodiment, the substantially RF transparent material substantially electrically non-conductive. This may prevent an electrical short circuit being formed between the antenna portions as a result of contact with an electrically conductive item. This may ensure that the signal power of an RF return signal transmitted by the RFID tag is maintained at a preselected level.

In an embodiment, the mould tool is shaped to form the moulded cover with a smooth external shape. This may minimize the risk of damage to a user's hand or gloves during use.

Corresponding embodiments also apply to the RFID tag assembly according to the third aspect of the invention.

A third aspect of the invention provides an RFID tag assembly comprising a mounting base, a passive mount-on-metal RFID tag and a moulded cover. The RFID tag assembly is manufactured by providing a mounting base made of an electrically conductive material and providing a passive mount-on-metal RFID tag. The RFID tag comprises an integrated circuit, IC, chip provided at a first position and an antenna provided on one side. The RFID tag is mounted on the mounting base with said one side of the RFID tag coupled to a first side of the mounting base, to form an RFID tag-mounting base sub-assembly. A mould tool comprising a mould cavity shaped to form a cover of the RFID tag assembly is provided. The RFID tag-mounting base sub-assembly is located within the mould cavity such that a void defining the cover is formed between the mould tool and the RFID tag-mounting base sub-assembly. A substantially RF transparent material in a molten state is delivered into the void between the mould tool and the RFID tag-mounting base sub-assembly. The substantially RF transparent material is allowed to cool into a solid state to thereby form a cover over the RFID tag-mounting base sub-assembly, such that the mounting base and the cover together encapsulate the RFID tag. The substantially RF transparent material has a temperature in the molten state on delivery into the void that is higher than a maximum tolerable temperature of the integrated circuit chip. The substantially RF transparent material is delivered into the void at a second position removed from first position and the mould tool is configured to cause the substantially RF transparent material to cool as it flows towards the first position such that the temperature of the substantially RF transparent material does not exceed the maximum tolerable temperature of the integrated circuit chip when the substantially RF transparent material reaches the first position.

The RFID tag assembly has a cover bonded to the RFID tag and mounting base, meaning the RFID tag assembly does not require any mechanical fixing between the cover and the mounting base. Moulding the cover may enable smaller RFID tags to be used, and the RFID tag assembly to be smaller than is possible for prior art RFID tags for use on surgical instruments. The cover of the RFID tag may be formed by moulding, for example using known injection moulding techniques, without damaging the IC chip of the RFID tag.

Using a mounting base made of an electrically conductive material may provide consistent grounding of the RFID tag to a consistent electrically conductive mass, which may ensure consistent operation of the RFID tag irrespective of the size or shape of metal object on which the RFID tag assembly is mounted. Using a mounting base made of an electrically conductive material may mitigate the occurrence of detuning of the RFID tag which can occur when a passive mount-on-metal RFID tag is not properly grounded. This may increase the communication distance of the RFID tag.

A fourth aspect of the invention provides a surgical instrument comprising a metal body and having an RFID tag assembly mounted on the metal body. The RFID tag assembly comprises a mounting base, a passive mount-on-metal RFID tag and a moulded cover. The mounting base is made of an electrically conductive material. The RFID tag comprises an integrated circuit, IC, chip and an antenna provided on one side. The RFID tag is mounted on the mounting base with said one side of the RFID tag coupled to a first side of the mounting base, to form an RFID tag-mounting base sub-assembly. The moulded cover is made of a substantially RF transparent material. The moulded cover is moulded over the RFID tag-mounting base sub-assembly such that the mounting base and the moulded cover together encapsulate the RFID tag.

Embodiment of the invention will now be described, by way of example only, with reference to the accompanying drawings.

DETAILED DESCRIPTION

The same reference numbers will be retained for corresponding features or steps in different embodiments.

Figure 1:
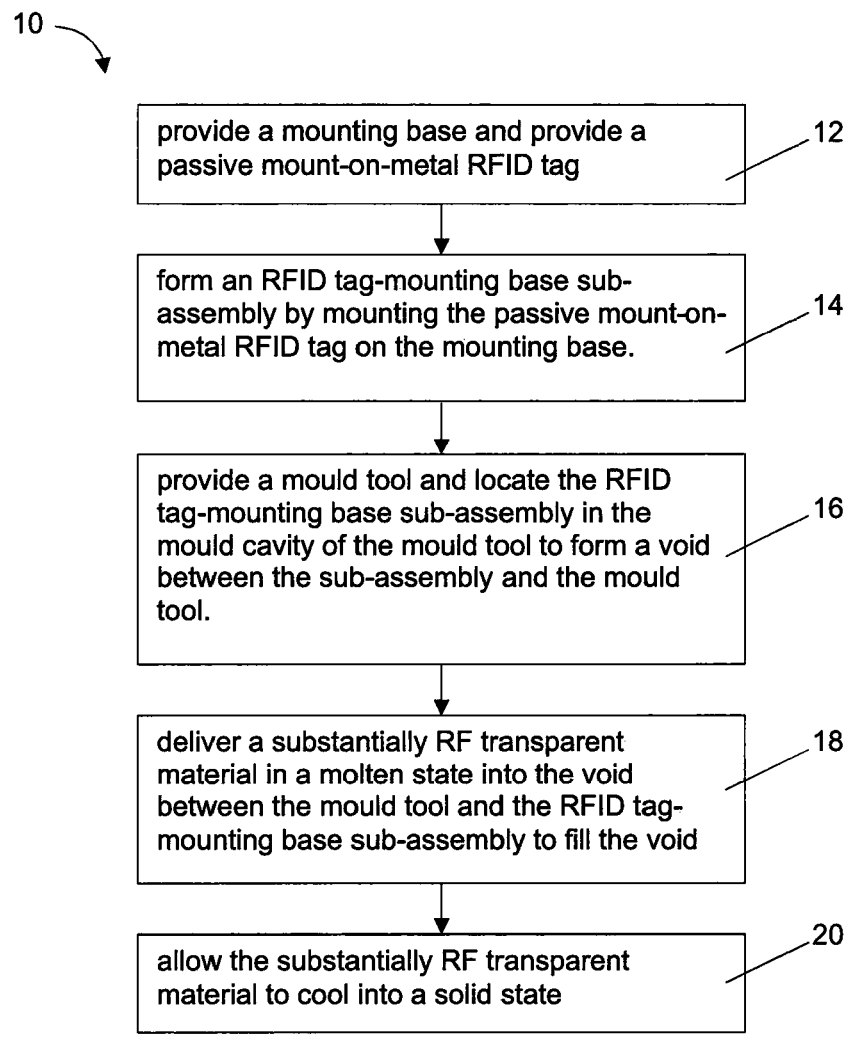
FIGS. 1 and 2 are flow charts illustrating the steps of methods of manufacturing an RFID tag assembly according to embodiments of the invention.

One embodiment of the invention provides a method of manufacturing an RFID tag assembly, as illustrated in FIG. 1.

The method 10 comprises providing a mounting base made of an electrically conductive material and providing a passive mount-on-metal RFID tag 12. The RFID tag comprises an integrated circuit, IC, chip provided at a first position on the RFID tag and an antenna provided on one side of the RFID tag.

The RFID tag is mounted on the mounting base with its one side coupled to a first side of the mounting base 14; this forms an RFID tag-mounting base sub-assembly.

A mould tool is provided comprising a mould cavity shaped to form a cover of the RFID tag assembly. The RFID tag-mounting base sub-assembly is then located within the mould cavity of the mould tool such that a void defining the cover is formed between the mould tool and the sub-assembly 16. A substantially RF transparent material in a molten state is delivered into the void to fill the void 18. The material is then allowed to cool 20, to thereby change from its molten state into a solid state, to form a cover over the RFID tag-mounting base sub-assembly. The so formed cover and the mounting base together encapsulate the RFID tag.

The substantially RF transparent material has a temperature in the molten state, on delivery into the void, that is higher than a maximum tolerable temperature of the IC chip on the RFID tag. The molten material is delivered into the void between the mould tool and the RFID tag-mounting base sub-assembly at a position removed from position where the IC chip is located. The mould tool is configured to cause the molten material to cool as it flows towards the location of the IC chip, such that the temperature of the substantially RF transparent material does not exceed the maximum tolerable temperature of the IC chip when the substantially RF transparent material reaches the IC chip location.

In an embodiment, the mould cavity is shaped to define the cover with a smooth external shape. This may minimize the risk of damage to a user's hand or gloves during use.

Figure 2:
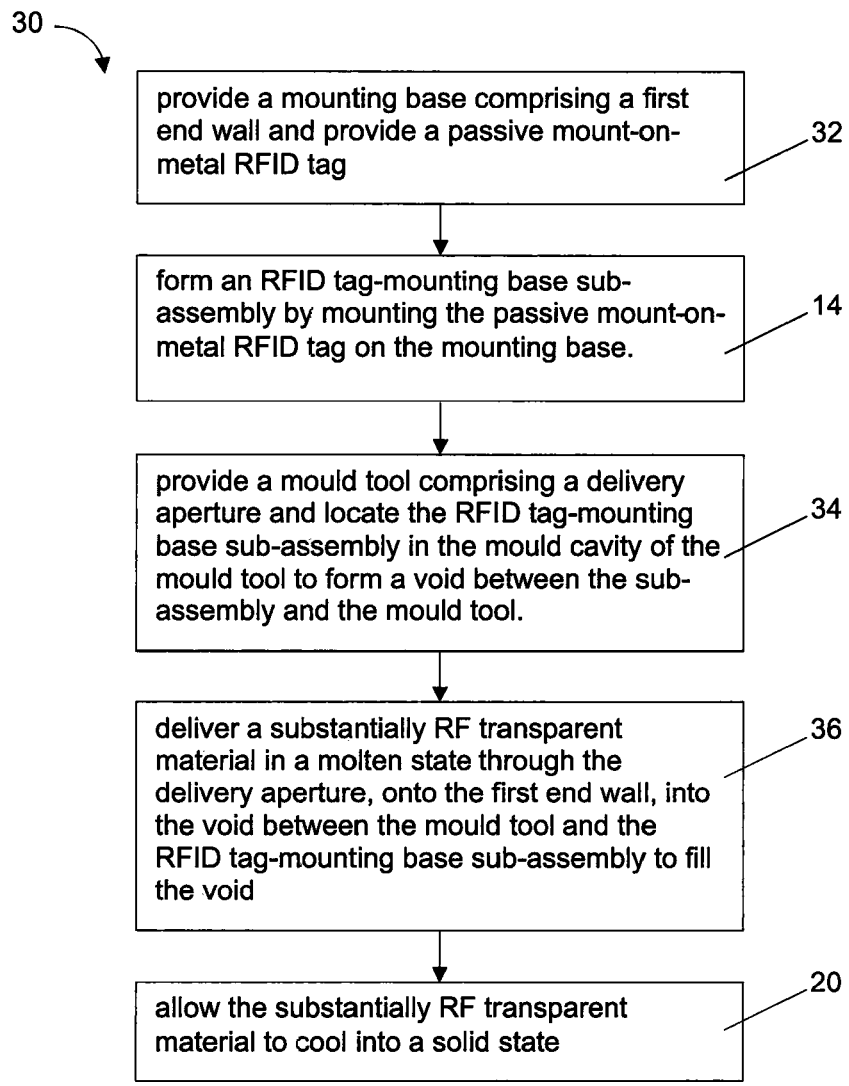
Figure 3:
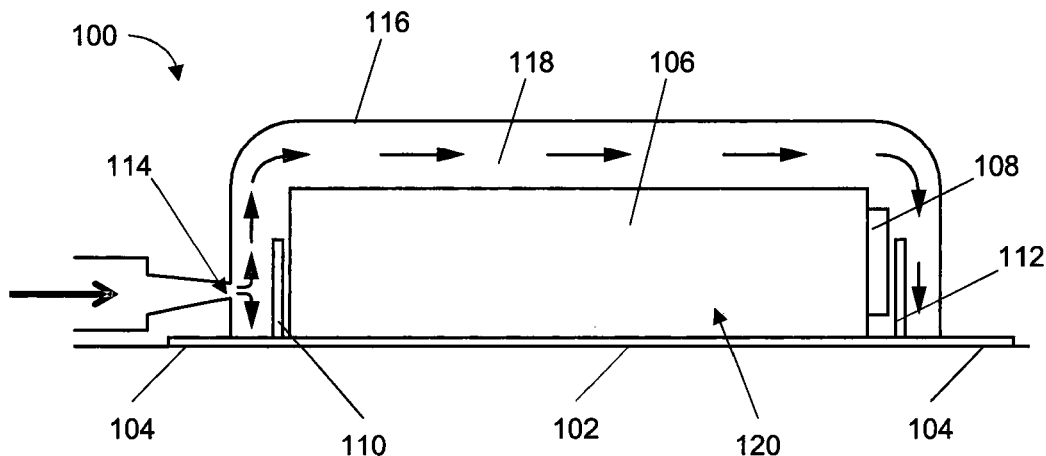
FIG. 3 is a schematic illustration of the apparatus used in performing the method of FIG. 2.

Referring to FIGS. 2 and 3, another embodiment of the invention provides a method 30 of manufacturing an RFID tag assembly 100, which is similar to the method 10 of the previous embodiment with the following modifications.

In this embodiment, a mounting base is provided 32 that comprises a central section 102, on which the RFID tag 106 is to be mounted, a first end section 104 extending from a first end of the central section and a second end section 104 extending from a second end of the central section.

The RFID tag is mounted 14 on the mounting base with its one side coupled to a first side of the central section of the mounting base; this forms an RFID tag-mounting base sub-assembly 120.

A mould tool 116 is provided 34 comprising a mould cavity 118 shaped to form a cover of the RFID tag assembly and the RFID tag-mounting base sub-assembly 120 is located 34 within the mould cavity of the mould tool to form a void; the RFID tag-mounting base sub-assembly is located within the mould cavity such that the first end section 104 and the second end section 104 each extend beyond the mould cavity 118. The end sections 104 of the mounting base form tags extending beyond the cover of the resulting RFID tag assembly.

The RFID tag antenna has a longitudinal axis and the mounting base additionally comprises a first end wall 110. The first end wall extends outwardly from the mounting base generally at one end of the longitudinal axis of the antenna.

The delivery aperture 114 in this embodiment is provided at one end of the mould tool 116, generally facing the first end wall 110. The molten substantially RF transparent material is delivered 36 into the void through the delivery aperture and impacts on the first end wall. It is thereby forced to flow into the void and around the RFID tag-mounting base sub-assembly 120 towards the IC chip 108 at the other end of the RFID tag, remote from the delivery aperture. By the time the molten material arrives at the IC chip 108 it has cooled to a temperature that does not exceed the maximum tolerable temperature of the IC chip.

The material is then allowed to cool 20, to thereby change from its molten state into a solid state, to form a cover over the RFID tag-mounting base sub-assembly. The so formed cover and the mounting base together encapsulate the RFID tag.

As illustrated in FIG. 3, the mounting base additionally comprises a second end wall 112 extending outwardly from the mounting base generally at a second end of the longitudinal axis of the antenna. The RFID tag 106 is mounted on the mounting base such that the IC chip is in contact with the second end wall. It is not essential to include the feature of a second end wall but it may assist with cooling the molten material in the vicinity of the IC chip and act as a heat sink for the IC chip, to maintain it at a temperature below its maximum tolerable temperature.

Figure 4:
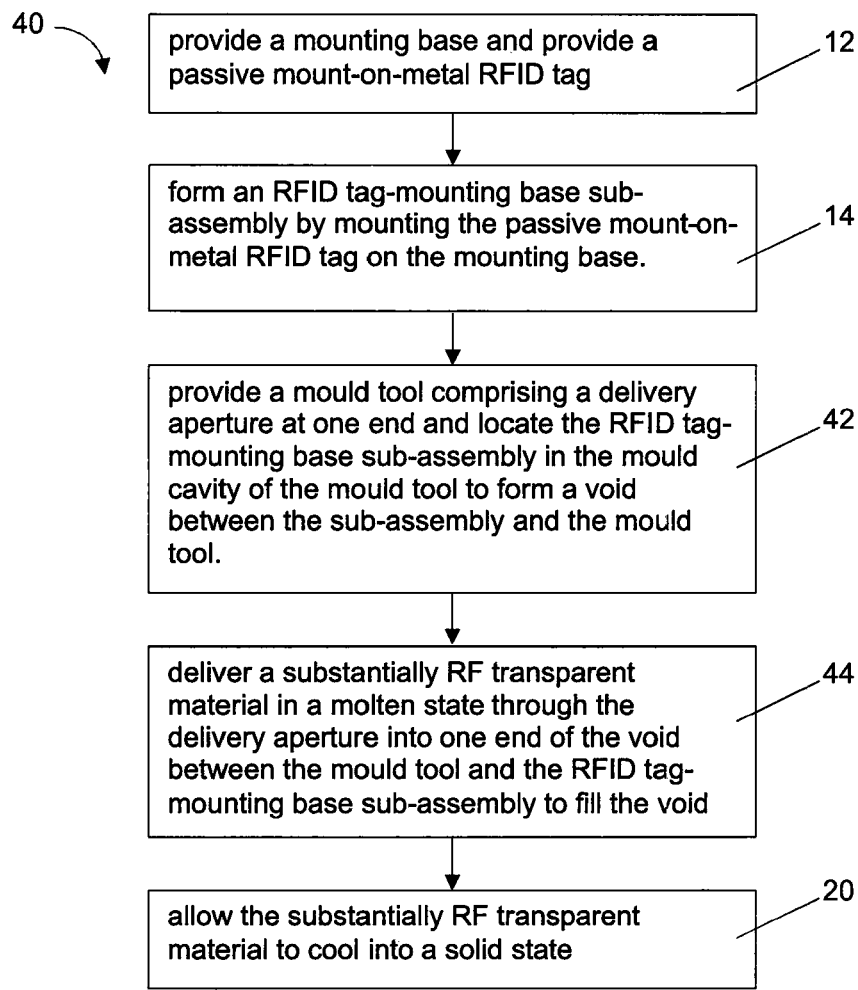
FIG. 4 is a flow chart illustrating the steps of methods of manufacturing an RFID tag assembly according to an embodiment of the invention.
Figure 5:
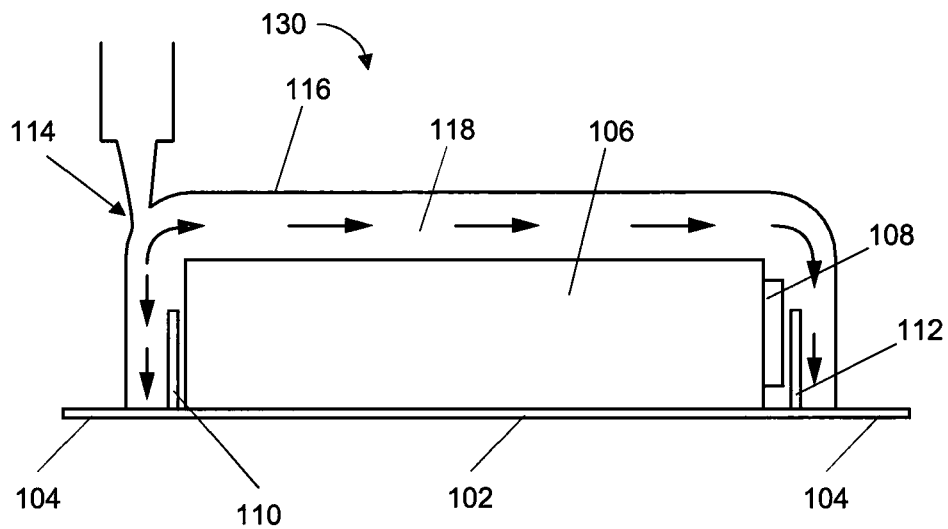
FIG. 5 is a schematic illustration of the apparatus used in performing the method of FIG. 4.

In a further embodiment, described with reference to FIGS. 4 and 5, a method 40, 130 of manufacturing an RFID tag assembly is provided that is similar to the method of the previous embodiment, with the following modifications.

The delivery aperture 114 in this embodiment is again provided at one end of the mould tool 116, but in this embodiment the delivery aperture is provided in the top of the mould tool (as orientated in the drawing), facing the mounting base 102, 104. The molten substantially RF transparent material is delivered into the void at one end through the delivery aperture 44, with part of the flow impacting on the mounting base and the remaining flow being forced to flow into the void and around the RFID tag-mounting base sub-assembly 120 towards the IC chip 108 at the other end of the RFID tag, remote from the delivery aperture. By the time the molten material arrives at the IC chip 108 it has cooled to a temperature that does not exceed the maximum tolerable temperature of the IC chip.

Figure 6:
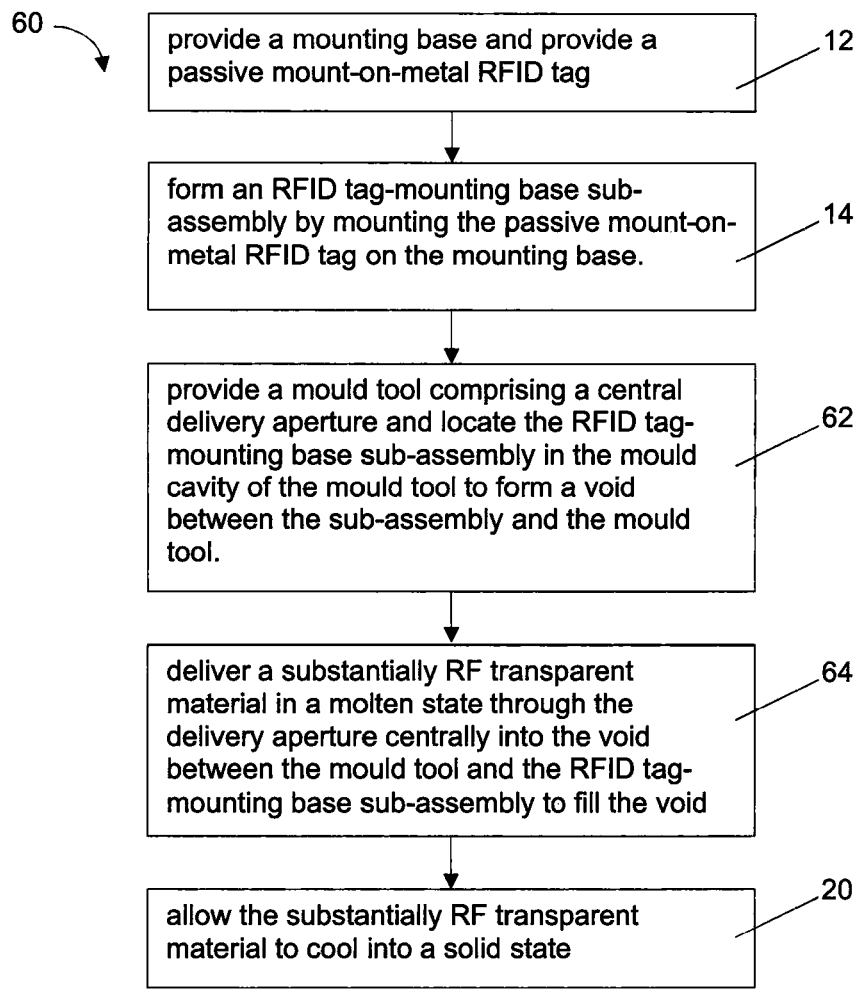
FIG. 6 is a flow chart illustrating the steps of methods of manufacturing an RFID tag assembly according to an embodiment of the invention.
Figure 7:
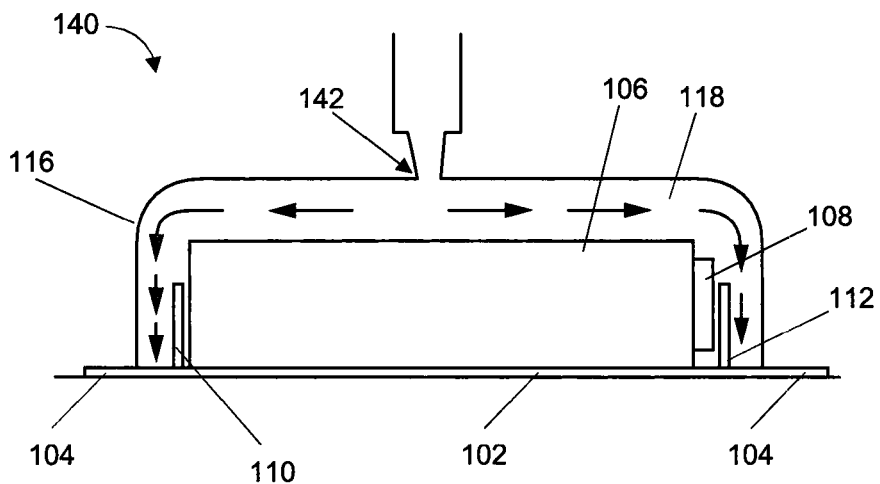
FIG. 7 is a schematic illustration of the apparatus used in performing the method of FIG. 6.

In a further embodiment, described with reference to FIGS. 6 and 7, a method 60, 140 of manufacturing an RFID tag assembly is provided that is similar to the method of the previous embodiment, with the following modifications.

The delivery aperture 142 in this embodiment is again provided in the top of the mould tool (as orientated in the drawing), facing the mounting base 102, 104, but in this embodiment the delivery aperture is located generally centrally to the mould cavity of the mould tool. The substantially RF transparent material is therefore delivered into the void generally centrally, impacting onto the RFID tag and being forced to flow around the RFID tag-mounting base sub-assembly 120 towards each end of the RFID tag. As before, by the time the molten material arrives at the IC chip 108 it has cooled to a temperature that does not exceed the maximum tolerable temperature of the IC chip.

In a preferred arrangement of the embodiments described with reference to FIGS. 2 to 7 the substantially RF transparent material is a thermoplastic, specifically polyphenylsulfone. The molten polyphenylsulfone is delivered at a temperature in the range 320-340° C. and is injected into the mould tool at high pressure, for example around 180 bar. The location of the delivery aperture facing the first end wall or facing the mounting base ensures that the RFID tag is not dislodged by the high pressure flow of molten polyphenylsulfone. The mould tool is configured to cool the molten polyphenylsulfone to a temperature in the range 150-170° C., which is a typical maximum tolerable temperature of the IC chip 108 of the RFID tag 106.

It will be appreciated that other thermoplastic materials may be used in place of polyphenylsulfone.

In a further embodiment, a layer of silicone is applied over the IC chip end of the RFID tag prior to locating the RFID tag-mounting base sub-assembly within the mould cavity. The silicone layer acts as a heat shield over the IC chip, further protecting it from the hot molten polyphenylsulfone.

Figure 8:
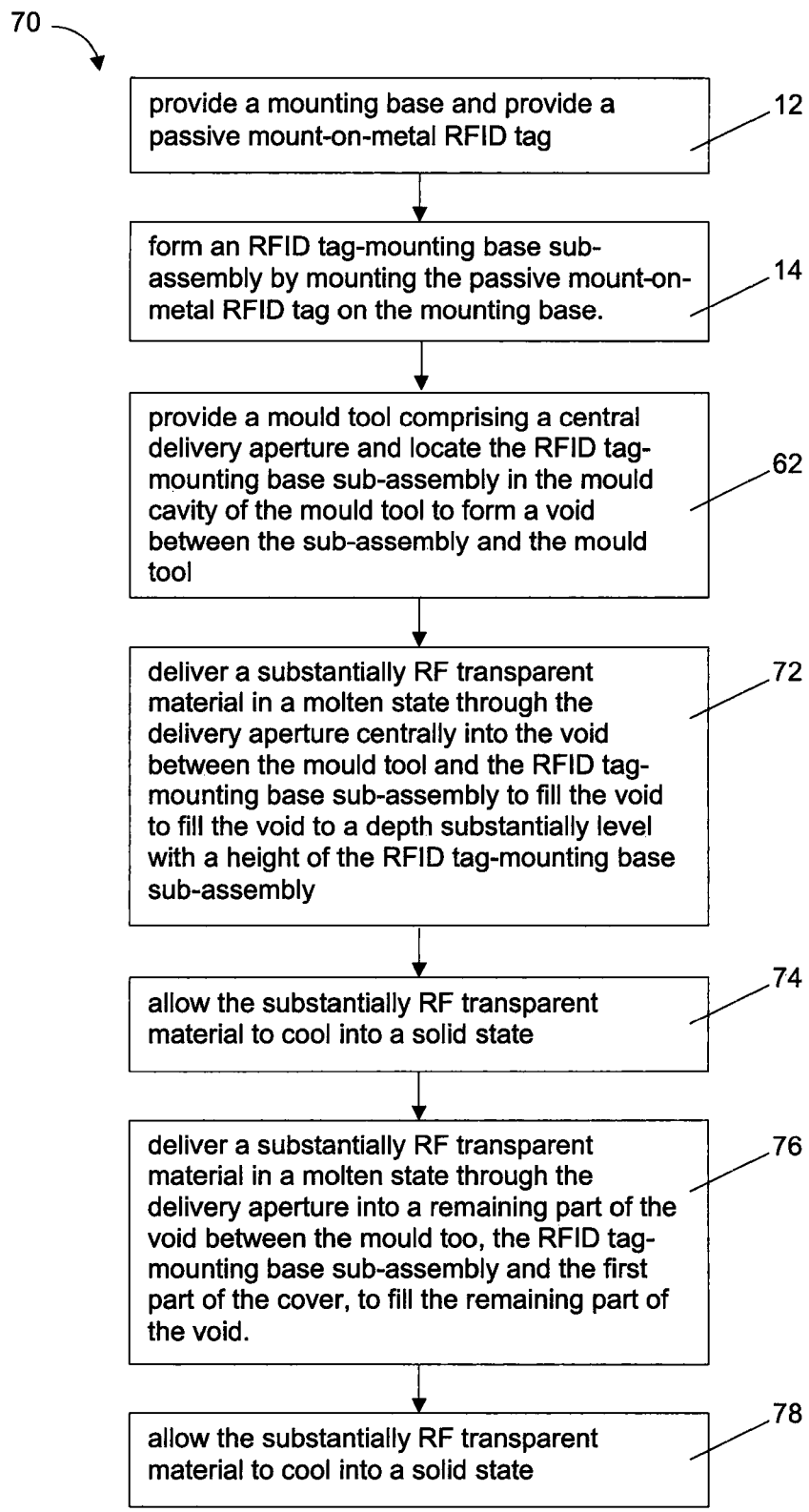
FIG. 8 is a flow chart illustrating the steps of methods of manufacturing an RFID tag assembly according to an embodiment of the invention.

Referring to FIG. 8, in another embodiment the method 50 of manufacturing an RFID tag assembly comprises a two-stage delivery process for delivering the molten substantially RF transparent material into the void. The RFID tag is pressed downwardly onto the mounting base during at least the first stage of the delivery process and preferably during both stages of the delivery process, to ensure good contact is maintained between the RFID tag and the mounting base.

The first stage comprises delivering molten material into the void to fill the void to a depth substantially level with a height of the RFID tag-mounting base sub-assembly 52. This first amount of the substantially RF transparent material is then allowed to cool into a solid state to thereby form a first part of the cover 54.

The second stage comprises delivering a subsequent amount of the molten material into a remaining part of the void between the mould tool, the RFID tag-mounting base sub-assembly and the first part of the cover to fill the remaining part of the void 56. This subsequent amount of molten substantially RF transparent material is then allowed to cool into a solid state to thereby form a second part of the cover 58. The second part of the cover bonds to the first part of the cover during the delivery and/or cooling stages.

Figure 9:
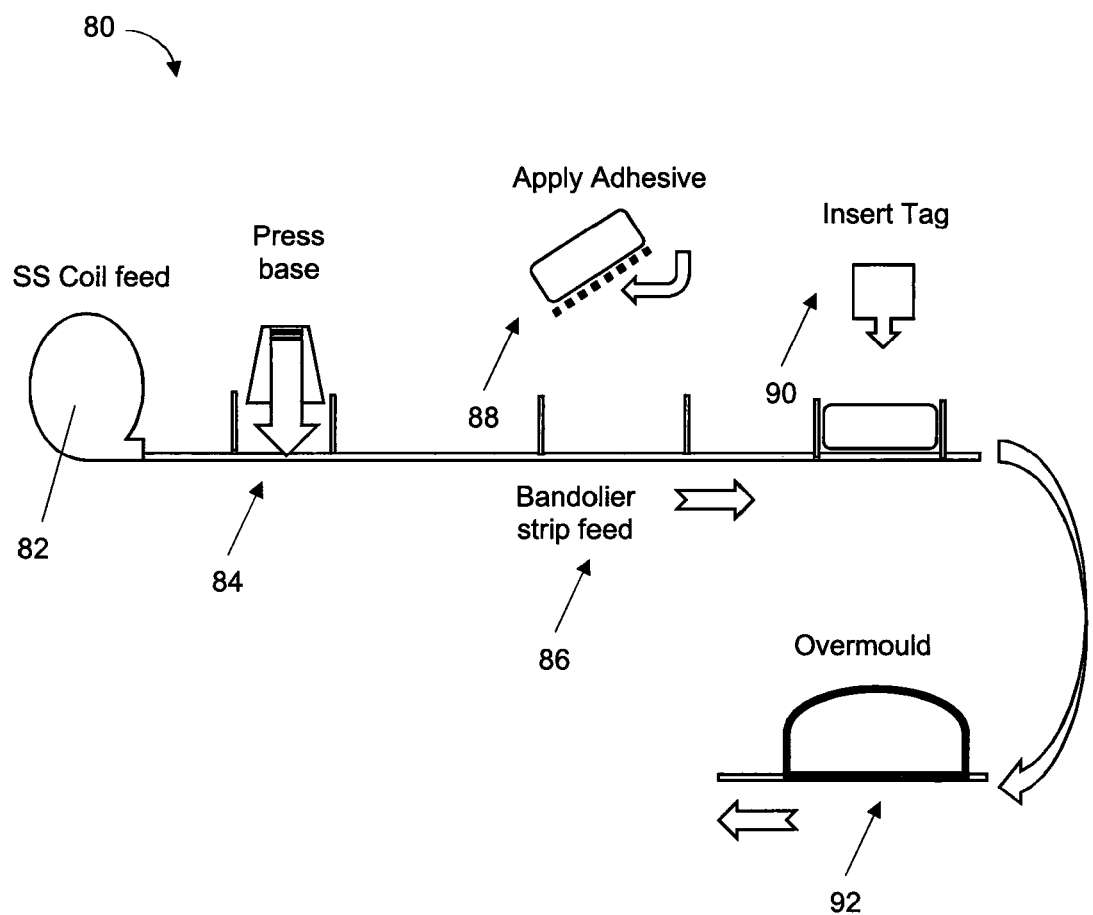
FIG. 9 illustrates the steps of methods of manufacturing an RFID tag assembly according to an embodiment of the invention.

FIG. 9 illustrates an embodiment of a method 80 of manufacturing an RFID tag assembly that is similar to the methods 10, 30, 40, 50, 60, 70 described above, with the following modifications.

In this embodiment, the method 80 is performed on a manufacturing assembly line based on a bandolier strip feed 86. The mounting base is provided by feeding a stainless steel strip 82 to a press tool 84 and then cutting a blank for the mounting base from the stainless steel strip. The blank is then press formed to form first and second end walls and to form low side walls along the longitudinal sides of the mounting base; these side walls are provided to assist in the correct location of the RFID tag onto the mounting base in the subsequent step. The bandolier is then moved forward to the next processing stage where the RFID tag is provided. Optionally, adhesive may be applied to the underside of the RFID tag 88 (as orientated in the drawing), to ensure intimate contact between the RFID tag and the mounting base during the remaining steps. The RFID tag is then placed on the mounting base 90 ensuring that the IC end of the RFID tag rests against the second end wall. The bandolier is then moved forward to feed the RFID tag-mounting base sub-assembly into a moulding machine and the mould tool is located over the sub-assembly. Molten polyphenylsulfone is injected into the void between the mould tool 92 and the sub-assembly, as described above, and the polyphenylsulfone is allowed to cool.

Figure 10:
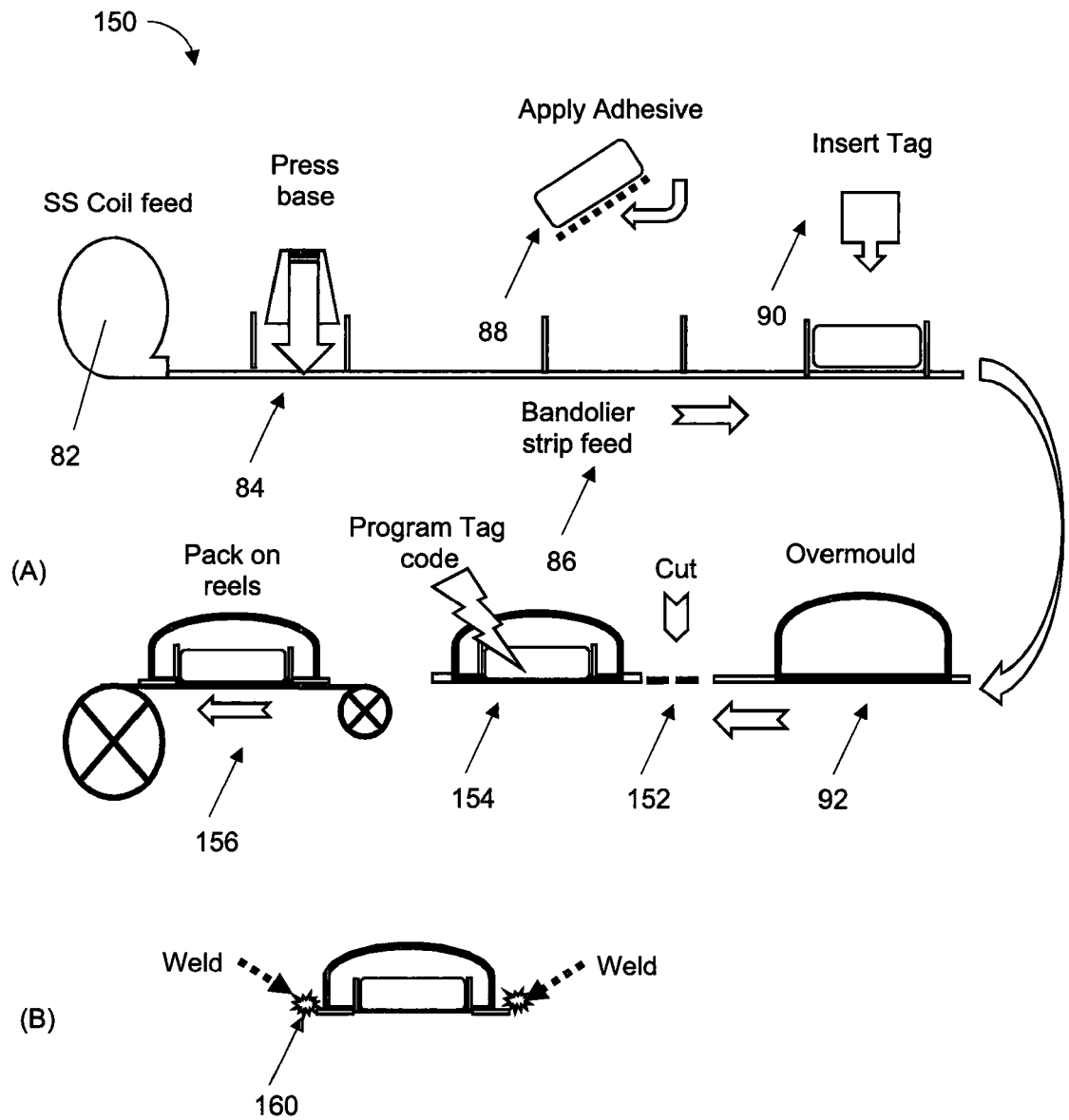
FIG. 10A illustrates additional steps following the steps shown in FIG. 9
FIG. 10B illustrates the process of attaching an RFID tag assembly to a device, such as a surgical instrument.

FIG. 10A illustrates a method 150 according to a further embodiment, in which additional steps are performed after the steps illustrated in FIG. 9.

In this embodiment, the bandolier strip is cut 152 after the RFID tag assembly, to remove it from the bandolier strip. The RFID tag assembly is then picked up, typically by a robot, by one or both of the tags and fed under an RFID tag reader, where program code and RFID tag identification information is downloaded onto the IC chip 154. The programmed RFID tag assembly is then placed onto a packaging reel, typically a soft sticky roll, for storage and transport.

As illustrated in FIG. 10B, an end user of the RFID tag assembly may then spot weld 160 or laser weld the tags on the ends of the RFID tag assembly to securely attach it to a device, such as a surgical instrument.

Figure 11:
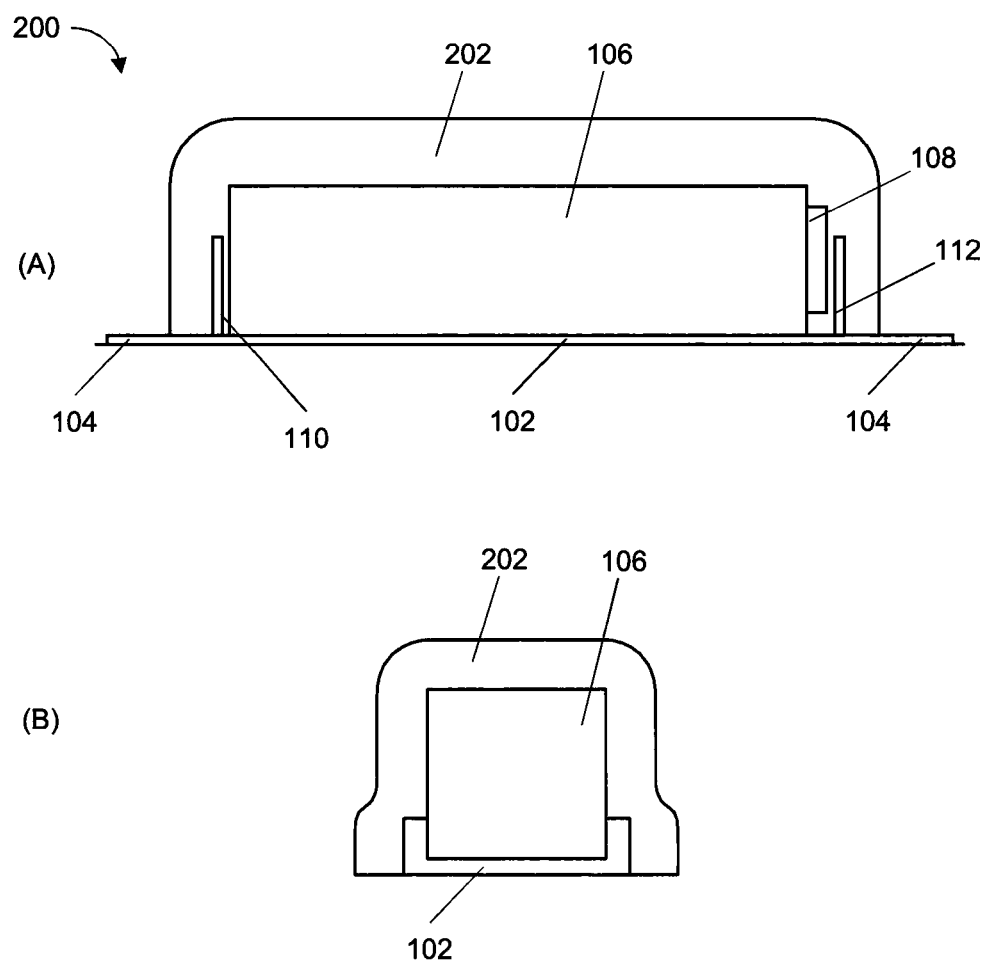
FIGS. 11 and 12 are schematic illustrations of an RFID tag assembly according to an embodiment of the invention.
Figure 12:
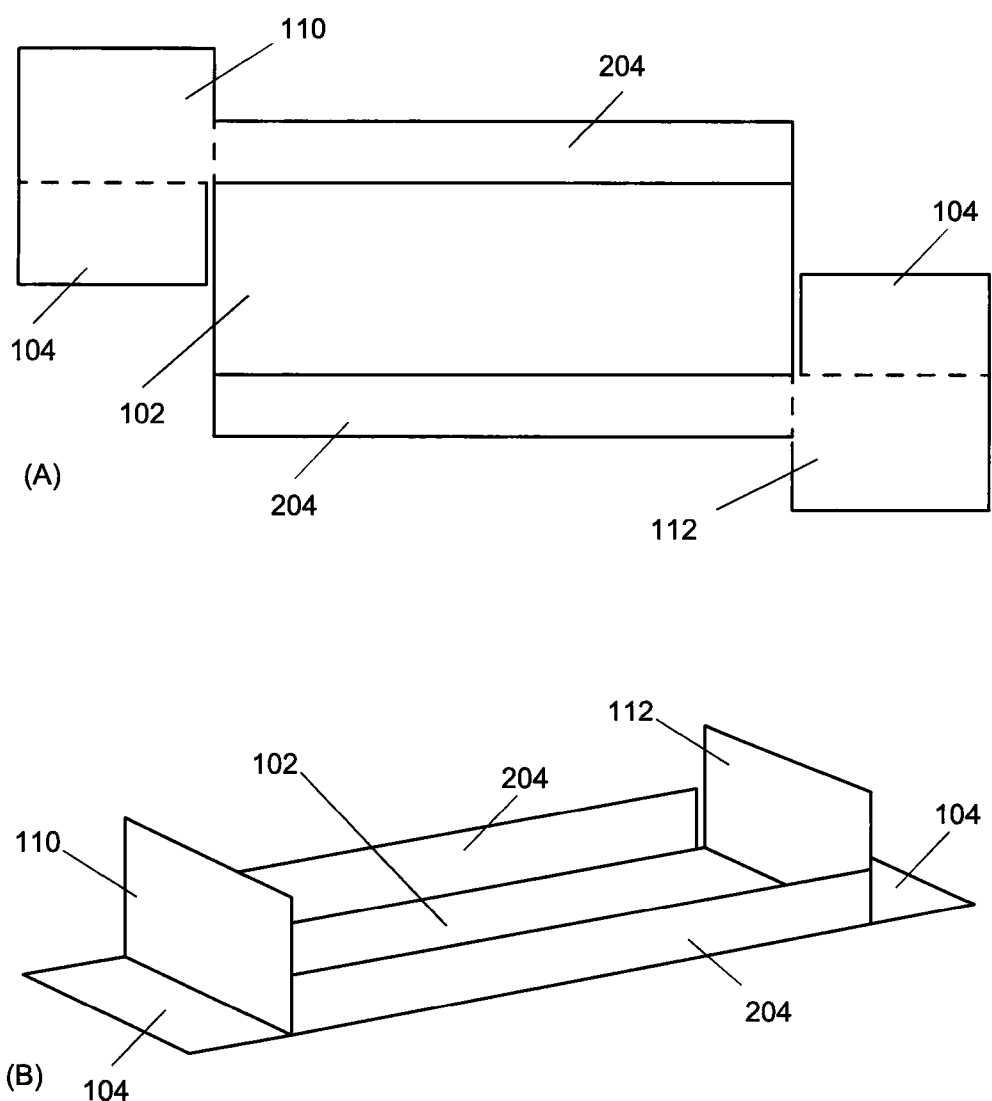

A further embodiment of the invention provides an RFID tag assembly 200, as illustrated in FIGS. 11 and 12.

The RFID tag assembly 200 comprises a mounting base 102, 104 made of an electrically conductive material, a passive mount-on-metal RFID tag 106 and a moulded cover 202.

The RFID tag comprises an integrated circuit, IC, chip 108 and an antenna provided on one side (not shown). The RFID tag is mounted on the mounting base with one side coupled to a first side of the mounting base, to form an RFID tag-mounting base sub-assembly.

The moulded cover is made of a substantially RF transparent material and is moulded over the RFID tag-mounting base sub-assembly such that the mounting base and the moulded cover together encapsulate the RFID tag.

The mounting base comprises a central section 102, on which the RFID tag is mounted, a first end section 104 extending from a first end of the central section and a second end section 104 extending from a second end of the central section.

The moulded cover is formed over the RFID tag-mounting base sub-assembly such that the first end section and the second end section form respective tags extending beyond the moulded cover.

The antenna of the RFID tag 106 has a longitudinal axis and the mounting base comprises a first end wall 110 extending outwardly from the mounting base at one end of the longitudinal axis of the antenna and a second end wall 112 extending outwardly from the mounting base at the other end of the longitudinal axis of the antenna.

The mounting base has an engagement lip 204 extending along each longitudinal edge. The engagement lip defines a locating recess for locating the RFID tag on the mounting base.

Each end wall has a keying formation that engages with the substantially RF transparent material of the moulded cover, to key the moulded cover to the RFID tag-mounting base sub-assembly. The keying formation may for example be an aperture formed in the end wall that is filled by the material or ledge formed along an edge of the end wall that is surrounded by the material.

In an embodiment, the substantially RF transparent material is polyphenylsulfone. It will be appreciated that other thermoplastic materials may be used in place of polyphenylsulfone.

The mounting base may be formed from blank, as shown in FIG. 12A, and press formed into shape, as shown in FIG. 12B.

The RFID tag assembly 200 may be manufactured using any of the above described methods.

In a further embodiment, one side of the RFID tag is close coupled to the first side of the mounting base. This may enable an optimal ground of the RFID tag to the mounting base.

The antenna of the RFID tag has an antenna plane and each end wall 110, 112 extends generally orthogonally to the antenna plane. This may reduce disruption of the antenna field by an end wall; extending in this direction each end wall may be substantially outside the antenna field.

In an embodiment, the antenna is a dipole antenna comprising first and second antenna portions. Each antenna portion has a longitudinal axis and an antenna plane. The first antenna portion is provided on said one side of the RFID tag and the second antenna portion is provided on a second side of the RFID tag, generally opposite said one side. This may enable a larger antenna to be used while maintaining good grounding between the antenna and the mounting base. Providing the or each end wall generally at a respective end of the longitudinal axis of the antenna may reduce disruption of the antenna field by a said end wall; in this location the or each end wall may be substantially outside the antenna field.

In an embodiment, the antenna is configured to transmit and received linearly polarised RF signals.

In an embodiment, the RFID tag is a ceramic passive mount on metal comprising a ceramic core. The antenna portions are provided on respective sides of the ceramic core and the IC chip is provided on one end of the ceramic core. The ceramic core may prevent inductive coupling between the antenna portions, which may ensure that the signal power of an RF return signal transmitted by the RFID tag is maintained at a preselected level. Maintaining a separation between the antenna portions with the ceramic core may ensure that the signal power of an RF return signal transmitted by the RFID tag is maintained at a preselected level.

In an embodiment, the electrically conductive material is one of a metal and a carbon-fibre composite. Using a metal mounting base may provide consistent grounding to metal of the RFID tag to a consistent mass, which may ensure consistent operation of the RFID tag irrespective of the size or shape of metal object on which the RFID tag assembly is mounted. The mounting base may mitigate the occurrence of detuning of the RFID tag which can occur when a passive mount-on-metal RFID tag is not properly grounded. This may increase the communication distance of the RFID tag.

In an embodiment, the metal is a medical grade stainless steel.

In an embodiment, the substantially RF transparent material substantially electrically non-conductive. This may prevent an electrical short circuit being formed between the antenna portions as a result of contact with an electrically conductive item. This may ensure that the signal power of an RF return signal transmitted by the RFID tag is maintained at a preselected level.

In an embodiment, the mould cavity is shaped to form the moulded cover with a smooth external shape. This may minimize the risk of damage to a user's hand or gloves during use.

Figure 13:
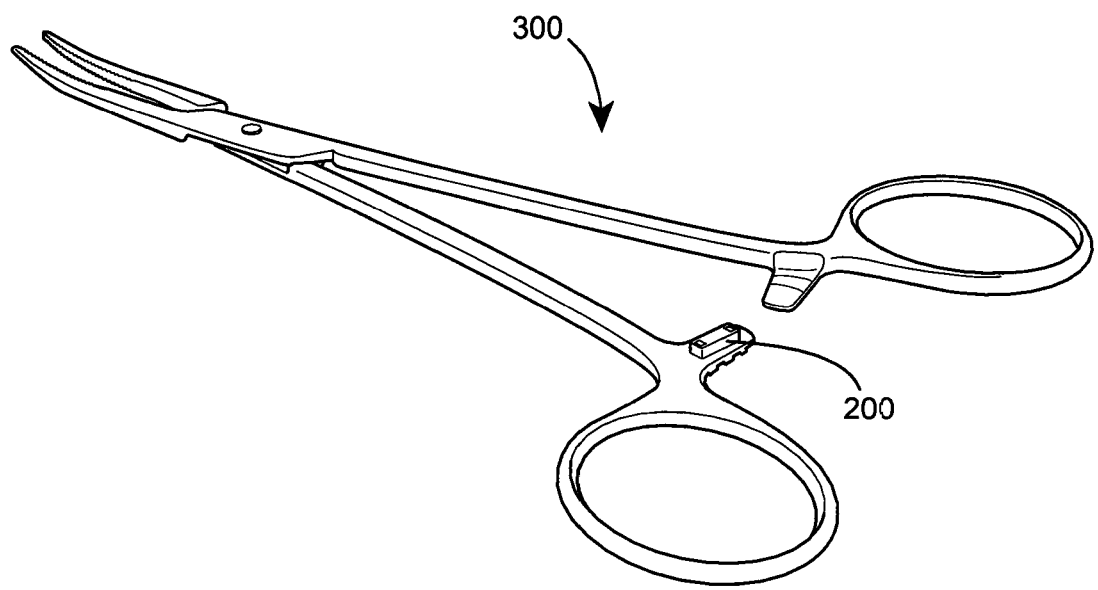
FIGS. 13 and 14 are schematic illustrations of surgical instruments according to embodiments of the invention.

Referring to FIG. 13, a further embodiment of the invention provides a surgical instrument 300 comprising a metal body, in this embodiment a pair of Mosquito forceps, and having an RFID tag assembly 200, as described above, mounted on the metal body.

The RFID tag assembly 200 is mounted on the metal body of the forceps by laser or spot welding the tags 104 on the mounting base to the forceps 300. The mounting base may alternatively be bonded to the metal body of the forceps using an adhesive or may be mechanically fixed onto the forceps.

Figure 14:
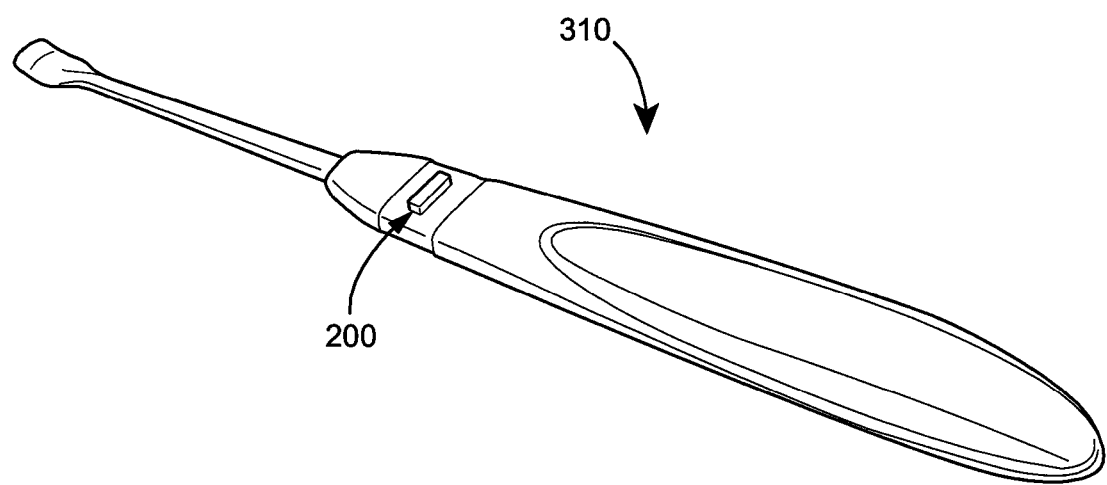

Referring to FIG. 14, a further embodiment of the invention provides a surgical instrument 310 comprising a metal body, in this embodiment a Splicer spoon. The surgical instrument has an RFID tag assembly 200 mounted on its metal body.

The mounting base 102, 104 of the RFID tag assembly 200 is mounted on the metal body of the surgical instrument. The metal body of the surgical instrument is made of a ferrous metal, in this case surgical stainless steel.

The invention claimed is:

1. A method of manufacturing an RFID tag assembly, the method comprising:
    providing a mounting base made of an electrically conductive material;
    providing a passive mount-on-metal RFID tag, the RFID tag comprising an integrated circuit chip provided at a first position and an antenna provided on one side of the RFID tag;

mounting the RFID tag on the mounting base with said one side of the RFID tag coupled to a first side of the mounting base, to form an RFID tag-mounting base sub-assembly;

providing a mold tool comprising a mold cavity shaped to form a cover of the RFID tag assembly and locating the RFID tag-mounting base sub-assembly within the mold cavity such that a void defining the cover is formed between the mold tool and the RFID tag-mounting base sub-assembly; and delivering a substantially RF transparent material in a molten state into the void between the mold tool and the RFID tag-mounting base sub-assembly and allowing the substantially RF transparent material to cool into a solid state, to thereby form a cover over the RFID tag-mounting base sub-assembly, such that the mounting base and the cover together encapsulate the RFID tag, wherein the substantially RF transparent material has a temperature in the molten state on delivery into the void that is higher than a maximum tolerable temperature of the integrated circuit chip and the substantially RF transparent material is delivered into the void at a second position removed from first position and wherein the mold tool is configured to cause the substantially RF transparent material to cool as it flows towards the first position such that the temperature of the substantially RF transparent material does not exceed the maximum tolerable temperature of the integrated circuit chip when the substantially RF transparent material reaches the first position, wherein the antenna has a longitudinal axis and the mounting base additionally comprises a first end wall extending upwardly from the mounting base generally at one end of the longitudinal axis of the antenna and the mold tool comprises a delivery aperture at the second position, and wherein the substantially RF transparent material is delivered into the void through the delivery aperture such that the substantially RF transparent material is caused to flow into the void and around the RFID tag-mounting base sub-assembly towards the integrated circuit chip at the first position; and wherein the mounting base comprises a second end wall extending upwardly from the mounting base generally at a second end of the longitudinal axis of the antenna and wherein the step of mounting includes mounting the RFID tag on the mounting base such that an end of the RFID tag closest to the first position is in contact with the second end wall so that the second end wall provides a heatsink during the step of delivering the substantially RF transparent material to maintain the integrated circuit chip below the maximum tolerable temperature of the integrated circuit chip.

2. A method as claimed in claim 1, wherein the mounting base comprises a central section, on which the RFID tag is mounted, a first end section extending from a first end of the central section and a second end section extending from a second end of the central section, and wherein the RFID tag-mounting base sub-assembly is located within the mold cavity such that the first end section and the second end section each extend beyond the mold cavity, to thereby form respective mounting tags extending beyond the cover of the resulting RFID tag assembly.

3. A method as claimed in claim 1, wherein the delivery aperture generally faces the first end wall of the mounting base, and wherein when the substantially RF transparent material is delivered into the void through the delivery aperture it impacts on the first end wall, such that the substantially RF transparent material is forced to flow into the void and around the RFID tag-mounting base sub-assembly towards the integrated circuit chip at the first position.

4. A method as claimed in claim 1, wherein the delivery aperture generally faces towards the first side of the mounting base, and wherein the substantially RF transparent material is delivered into the void through the delivery aperture, such that the substantially RF transparent material is caused to flow into the void and around the RFID tag-mounting base sub-assembly towards the integrated circuit chip at the first position.

5. A method as claimed in claim 4, wherein the delivery aperture is located generally centrally to the mold cavity of the mold tool such that the substantially RF transparent material is delivered into the void generally centrally onto the RFID tag.

6. A method as claimed in claim 1, wherein at least the first end wall has a keying formation provided therein, the keying formation engaging with the substantially RF transparent material to key the cover to the RFID tag-mounting base sub-assembly.

7. A method as claimed in claim 1, wherein the substantially RF transparent material in a molten state is delivered into the void in a first stage and in a second, subsequent stage:

the first stage comprising delivering the substantially RF transparent material into the void to fill the void to a depth substantially level with a height of the RFID tag-mounting base sub-assembly and allowing the substantially RF transparent material to cool into a solid state to thereby form a first part of the cover; and the second stage comprising delivering the substantially RF transparent material into a remaining part of the void between the mold tool, the RFID tag-mounting base sub-assembly and the first part of the cover to fill the remaining part of the void and allowing the substantially RF transparent material to cool into a solid state to thereby form a second part of the cover, the second part of the cover bonding to the first part of the cover.

8. A method as claimed in claim 1, wherein the substantially RF transparent material is polyphenylsulfone.

9. A method as claimed in claim 1, wherein the provided passive mount-on-metal RFID tag is an encapsulated mount-on-metal RFID tag.

10. A method as claimed in claim 1, wherein the RFID tag includes opposed top and bottom sides and opposed first and second ends, wherein the first position is the first end of the RFID tag and the one side of the RFID tag is the bottom side of the RFID tag.

11. A method as claimed in claim 1, wherein the mounting step includes mounting the RFID tag on the mounting base with said antenna proximate the mounting base to thereby ground the RFID tag to the electrically conductive material of the mounting base.

12. A method as claimed in claim 1, wherein the RFID tag includes opposed top and bottom sides and opposed first and second ends, wherein the one side of the RFID tag is the bottom side of the RFID tag and wherein the providing a mold tool step includes locating the RFID tag-mounting base sub-assembly within the mold cavity such that the void defining the cover is formed between the mold tool and the top side of the RFID tag.

13. A method as claimed in claim 1, wherein the delivering step includes delivering a substantially RF transparent material to thereby form a cover such that the mounting base and the cover together encapsulate the RFID tag, the resulting RFID tag assembly designed and configured to transmit RF signals through the cover and be directly attached at the mounting base to an object for tracking of the object.

14. A method as claimed in claim 13, wherein the resulting RFID tag assembly is designed and configured to be directly attached at the mounting base to a metal object.

15. A method as claimed in claim 1, wherein the RFID tag is a ceramic passive mount on metal tag comprising a ceramic core having top and bottom sides and first and second ends, the antenna disposed on at least one of the top and bottom sides of the ceramic core and the integrated circuit chip disposed on one of the first and second ends of the ceramic core.

\* \* \* \* \*